United States Patent [19]

Klausen et al.

[11] Patent Number: 4,529,166
[45] Date of Patent: Jul. 16, 1985

[54] MAGNETIC VALVE

[75] Inventors: Jorn H. Klausen, Nordborg; Laurits B. Rasmussen; Svend Hansen, both of Sonderborg, all of Denmark

[73] Assignee: Danfoss A/S, Nordborg, Denmark

[21] Appl. No.: 645,783

[22] Filed: Aug. 30, 1984

[30] Foreign Application Priority Data

Sep. 16, 1983 [DE] Fed. Rep. of Germany ....... 3333491

[51] Int. Cl.³ .............................................. F16K 31/02
[52] U.S. Cl. .................................................... 251/141
[58] Field of Search ............................... 251/129, 141; 137/625.65

[56] References Cited

U.S. PATENT DOCUMENTS

| | | | |
|---|---|---|---|
| 2,705,608 | 4/1955 | Philips | 251/129 |
| 2,826,215 | 3/1958 | Wolfslau et al. | 251/129 |
| 3,172,637 | 3/1965 | Adams et al. | 137/625.65 |
| 3,521,851 | 7/1970 | Sorrow | 137/625.65 |
| 3,970,282 | 7/1976 | Hansen | 251/129 |

Primary Examiner—Samuel Scott
Assistant Examiner—Noah Kamen
Attorney, Agent, or Firm—Wayne B. Easton

[57] ABSTRACT

The invention relates to a magnetic valve assembly of the type in which a solenoid plunger upon excitation by a magnetic coil is displaceable against a housing end face having a valve seat. The plunger has a bore in which is disposed a closing element. A return spring in the plunger bore biasing the plunger away from the valve seat is between the far end of the plunger and a fixed abutment element which passes through the plunger. The plunger has a hole surrounding the abutment element which is sized to allow the plunger engage the valve seat and to limit the movement of the plunger away from the valve seat.

6 Claims, 1 Drawing Figure

U.S. Patent  Jul. 16, 1985  4,529,166
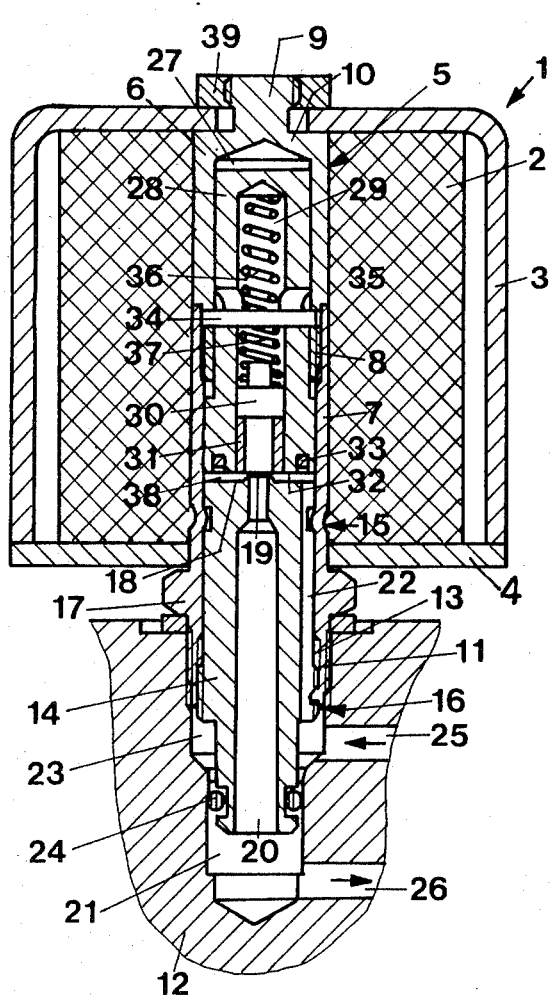

MAGNETIC VALVE

FIELD OF THE INVENTION

The invention relates to a magnetic valve of which the closing member is carried by a solenoid plunger which is provided with a longitudinal bore, is guided in a solenoid guide tube fixed with respect to the housing and, on exciting the magnetic coil, is displaceable against a housing end face having the valve seat and, on de-energisation, in the opposite direction by a return spring supported by a counterbearing fixed with respect to the housing.

DESCRIPTION OF THE PRIOR ART

In a known magnetic valve of this kind (US-PS 27 83 019), the closing member is displaceable in a blind hole of the solenoid plunger and is pressed against a beaded abutment by means of a compensating spring which extends between the closed end of the blind hole and the closing member. Beyond the central housing seat, the end of the housing opposite the solenoid plunger has at least one axially parallel bore as a supply or discharge passage and at least one further coaxial blind hole for receiving a return spring supported at the end of the solenoid plunger. This return spring places an asymmetric load on the solenoid plunger and cannot exert strong return forces.

In another known magnetic valve (DE-AS 11 99 087), which is in the form of a three-way valve, the return spring extends in a cylindrical annular groove of the solenoid plunger and is supported concentric to the valve seat against the end face of the housing.

In both cases, one of the two end faces co-operating on actuation of the magnetic valve is weakened by recesses in the material. This permits only limited magnetic forces to be exerted. Consequently, such magnetic valves are suitable only for systems having a limited fluid pressure.

SUMMARY OF THE INVENTION

The invention is based on the problem of providing a magnetic valve of the aforementioned kind which, with given dimensions, can operate at higher magnetic forces and thus also be suitable for systems having higher fluid pressures, for example for an oil pump with an operating pressure of 5 to 10 bar.

This problem is solved according to the invention in that the return spring is disposed in the longitudinal bore of the solenoid plunger, and the fixed counterbearing is formed by a strut which is held in the solenoid guide tube and passes through the longitudinal bore as well as the longitudinal holes in the solenoid plunger wall.

In this construction, neither the end face of the solenoid plunger surrounding the closing member nor the end face of the housing surrounding the valve seat is obstructed by apertures receiving the return spring. Under otherwise the same conditions, larger magnetic forces can be produced between the two end faces and thus larger fluid pressures can be controlled. The return spring inserted in the longitudinal bore of the solenoid plunger can be made sufficiently strong to effect proper return movement of the solenoid plunger upon de-energisation. Since the return spring is supported against the strut, it does not collide with the closing member even when the latter is held in the same longitudinal bore.

If the longitudinal bore is a blind hole in which the closing member is held, it is preferred for the return spring to be supported at the closed end of the blind hole. No additional measures need then be taken for retaining the return spring.

If the closing member in the longitudinal bore is displaceable against a compensating spring likewise arranged in the longitudinal bore, it is advantageous for the compensating spring to be supported against the strut on the side opposite to the return spring. This means that the compensating spring is not, as is usual, supported at a part movable together with the solenoid plunger. However, the function is not detrimentally affected.

In a very simple embodiment, the strut is a cylindrical pin.

Preferably, the solenoid tube consists of two overlapping tube sections connected at the point of overlap and the strut passes through only the inner tube section and has the outer tube section engaging over it. In this way, the strut is secured against slipping out sideways.

In particular, the inner tube section can be formed by the skirt of a magnetic plug. No additional component is therefore required for the two tube sections.

DESCRIPTION OF DRAWING

A preferred example of the invention will now be described with reference to the drawing. The single FIGURE is a section through a magnetic valve according to the invention, the coil and the magnetic return circuit being only diagrammatically illustrated.

DESCRIPTION OF PREFERRED EMBODIMENT

The magnetic valve 1 comprises an exciter coil 2 surrounded by a pot 3 and a plate 4 of magnetisable material. This arrangement is traversed by a solenoid guide tube 5 consisting of two sections 6 and 7 screw-connected to each other by a screwthread 8 at the overlapping portions. The section 6 is formed by the skirt of a magnetic plug 10 provided with the screwthread section 9. By means of a nut 39, the coil 2 and pot 3 can be secured at the solenoid guide tube 5. The section 7 consists of a magnetically non-conductive material and at the lower end has an external screwthread 11 for screwing into an apparatus portion 12 and an internal screwthread 13 for screw connection to a housing insert 14. The last-mentioned connection is secured by bead portions 15 and 16. A hexagon 17 facilitates screwing the magnetic valve into the apparatus 12.

The housing insert 14 consists of magnetisable material. A valve seat 19 disposed centrally at its end face 18 is connected by a bore 20 to a chamber 21. An axially parallel bore 22 likewise leads to the end face 18 from an annular chamber 23 which is separated from the chamber 21 by a sealing ring 24. The chamber 23 is connected to a supply passage 25 and the chamber 21 to a discharge passage 26.

A solenoid plunger 28 is axially displaceable in a longitudinal bore 27 of the solenoid guide tube 5 in the form of a blind hole. It has a longitudinal bore 29 in the form of a blind hole carrying a closing member 30 at the free end. An insert 31 pressed into the solenoid plunger 28 forms an abutment for the closing member. A copper ring 33 for magnetic damping purposes is inserted in the end face 32 of the solenoid. When the valve is open, a space 38 remains between the end face 32 and end face 18.

The longitudinal bore 29 is traversed by a strut 34 which is in the form of a cylindrical pin, passes through two longitudinal holes 35 in the solenoid plunger 28 and is held in suitable holes in the inner section 6 of the solenoid guide tube 5, whilst the outer section 7 engages over the strut 34.

A return spring 36 is disposed in the longitudinal bore 29. It is supported between the strut 34 and the closed end of the longitudinal bore 29.

The longitudinal bore 29 also contains a compensating spring 37. This is supported between the strut 34 and the closing member 30.

When the coil 2 is energised during operation, the magnetic forces between the end faces 18 and 32 must be so large that the solenoid plunger 28 will be moved towards the valve seat 19 against the fluid pressure existing in the space 38 between the said end faces. This causes the closing member 30 to be lifted against the force of the compensating spring 37. If the coil 2 is de-energized, the solenoid plunger 28 and thus the closing member 30 return to the illustrated rest position under the influence of the return spring 36, whereby the valve is opened again. The return spring must be so strong that it returns the solenoid plunger against the remanance force, there being usually no initial assistance from the fluid pressure because both end faces 18 and 32 are comparatively closely superposed.

We claim:

1. A magnetic valve assembly comprising, a housing element having an end face and a flow passage bore opening into said end face, a valve seat in said end face surrounding said opening, solenoid guide means having a longitudinal bore in axial alignment with said valve seat, a solenoid plunger having an axially extending bore, said plunger being disposed in said longitudinal bore, a sleeve element fixed in said plunger bore having an end thereof engageable with said valve seat, an abutment element fixed to said guide means and extending transversely of said guide means bore, said plunger having hole means surrounding said abutment element sized to allow said sleeve element to engage said valve seat and to limit the movement of said plunger away from said valve seat, a closing member in said plunger bore between said sleeve element and one side of said abutment element, and only return spring means in said plunger bore on the side thereof opposite said one side of said abutment element to bias said plunger away from said valve seat.

2. A magnetic valve assembly according to claim 1 in which said plunger bore is a blind hole in which said closing member is held, said return spring being supported at the closed end of said blind hole.

3. A magnetic valve assembly according to claim 1 including a compensating spring in said plunger bore between said closing member and said abutment element.

4. A magnetic valve assembly according to claim 1 characterized in that said abutment element is a cylindrical pin.

5. A magnetic valve assembly according to claim 1 characterized in that the solenoid guide means comprises two overlapping tube sections interconnected at the point of overlap, the abutment element passing through the inner one of said tube sections and has the outer one of said tube sections engaging over it.

6. A magnetic valve assembly according to claim 5 wherein said solenoid guide means has the form of a magnetic plug with an apron portion, said inner tube section being formed by said apron portion.

* * * * *